United States Patent [19]

Archer et al.

[11] Patent Number: 4,587,628
[45] Date of Patent: May 6, 1986

[54] METHOD AND APPARATUS FOR DYNAMIC INVOCATION OF UTILITIES

[75] Inventors: Gary D. Archer; Herm J. Greenberg, both of San Jose, Calif.

[73] Assignee: International Business Machines Corporation, Armonk, N.Y.

[21] Appl. No.: 558,268

[22] Filed: Dec. 5, 1983

[51] Int. Cl.[4] .............................................. G06F 7/22
[52] U.S. Cl. ................................... 364/900; 364/300
[58] Field of Search ... 364/200 MS File, 900 MS File, 364/200, 300, 900

[56] References Cited

U.S. PATENT DOCUMENTS

| | | | |
|---|---|---|---|
| 3,400,371 | 9/1968 | Amdahl et al. | 364/200 |
| 3,987,420 | 10/1976 | Badagnani | 364/200 |
| 4,210,961 | 7/1980 | Whitlow et al. | 364/300 |
| 4,295,206 | 10/1981 | Cain et al. | 364/900 |
| 4,412,280 | 10/1983 | Murphy et al. | 364/200 |
| 4,417,321 | 11/1983 | Chang et al. | 364/900 |

OTHER PUBLICATIONS

OS/VS Sort/Merge Programmer's Guide, Program No. 5740-SM1 Release 5, IBM Publication SC33-40-35-7, 8th Edition, pp. 100-112, Mar. 1981.
OS/VS2 System Programming Library: Data Management, IBM Publication GC26-3830-3, pp. 61-100.1
Brown, "Advanced ANS COBOL with Structured Programming", New York, John Wiley and Sons, pp. 366-387, 1977.
IBM System/360 COBOL Differences, IBM Publication GC28-6395-2, 3rd Edition, pp. 41-46, Oct. 1972.
IBM OS/VS COBOL Compiler and Library Programmer's Guide, IBM Publication SC28-6483-2, 3rd Edition, pp. 368-379, Oct. 1981.
IBM System/360 Transition Aids COBOL Language Differences, IBM Publication GC28-6570, 1965.
IBM VS COBOL for OS/VS, IBM Publication GC26-3857-2, 3rd Edition, pp. 231-246, Dec. 1981.
IBM OS Full American National Standard COBOL, IBM Publication GC28-6396-6, 7th Edition, pp. 245-259, Oct. 1981.
Freeman et al., "I/O Design: Data Management in Operating Systems", Rochelle Park, New Jersey, Hayden Book Co., 1977.
Knuth, "The Art of Computer Programming", vol. 3, Sorting and Searching, Reading, Mass. Addison-Wesley, 1973.
Common Business Oriented Language (COBOL) General Information, IBM Publication GF28-8053-2.
SyncSort OS Release 2.4 Programmer's Guide, Copyright SyncSort, Inc., 1981, Publication SI0101-1, pp. 6.01-6.09.

*Primary Examiner*—Raulfe B. Zache
*Attorney, Agent, or Firm*—R. Bruce Brodie; Shelley M. Beckstrand

[57] ABSTRACT

A program controlled digital computer is operated according to a utility program, such as a sort program which manages input/output directly (using very efficient execute channel programs (EXCP) or basic sequential access method (BSAM) facilities of the operating system), but in such a way as to provide to the caller (that is, the application program) the status and error information that is required. This is accomplished by defining an interface between the caller and sort enabling the caller to specify the names of the input and output data sets, the locations of routines to be executed for input and output, the locations of routines to be executed upon exit from input/output routines, and data areas for status information. Responsive to the interface, the sort process (1) selectively calls input/output exit routines provided by the caller, passing one record at a time over the interface, or provides to the operating system its own channel program for input/output with respect to a plurality of record, and (2) provides to the operating system information enabling the operating system to communicate error and status information directly to the application program.

13 Claims, 13 Drawing Figures

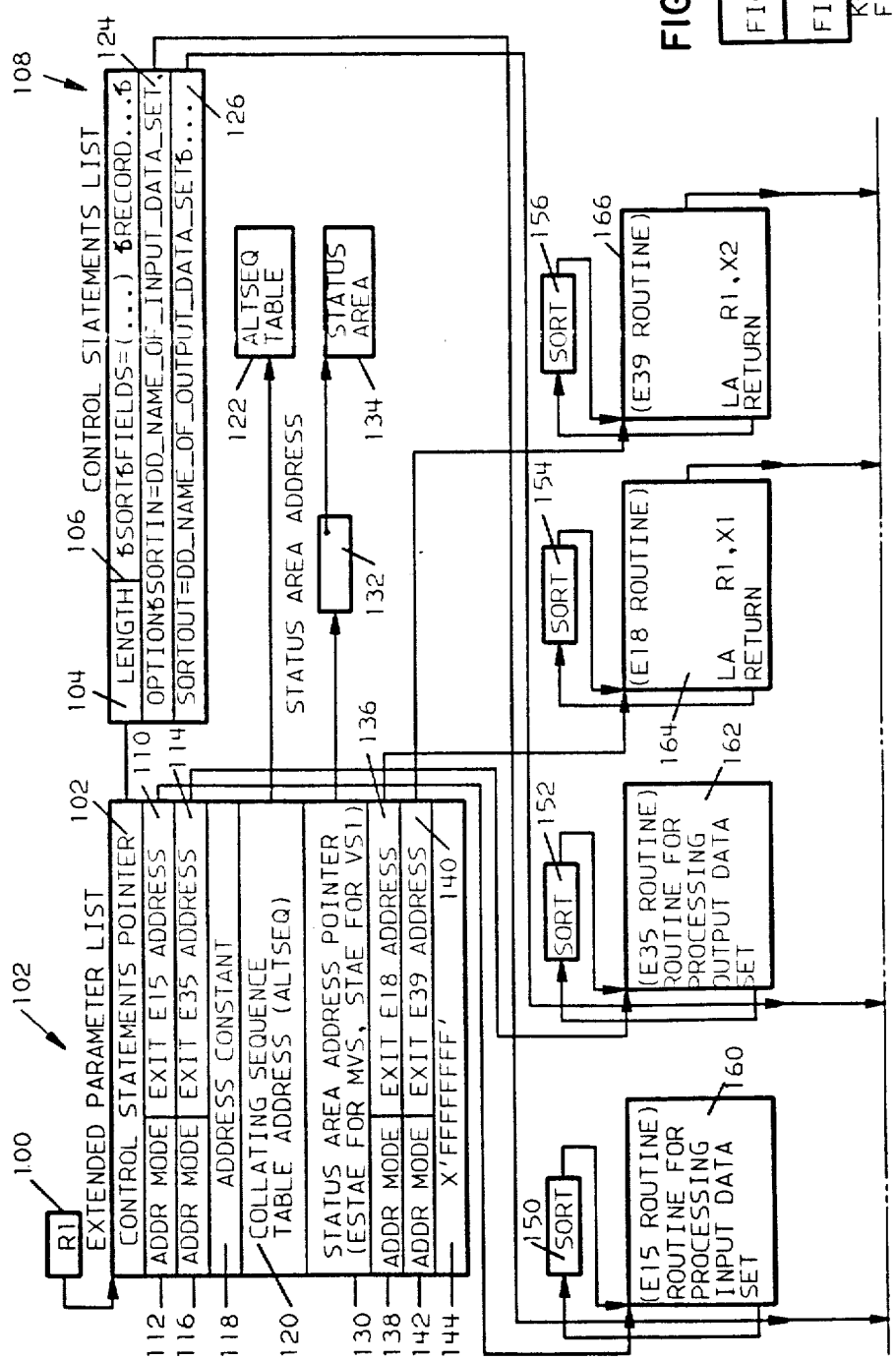

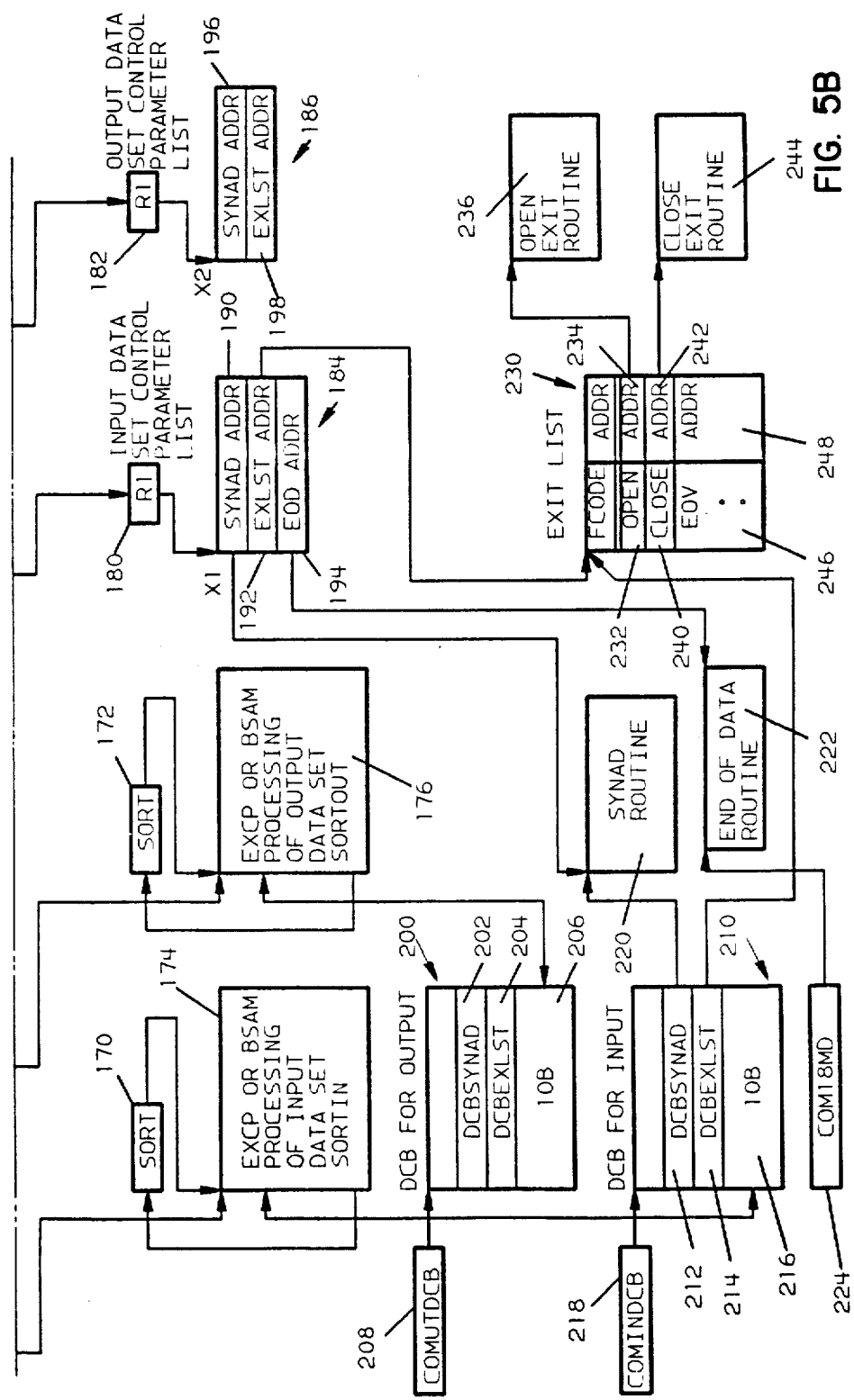

METHOD AND APPARATUS FOR DYNAMIC INVOCATION OF UTILITIES

BACKGROUND OF THE INVENTION

1. Field of the Invention

Method and apparatus for dynamic invocation of program utilities from a high level application program. More particularly, this invention provides an improved apparatus and method for transfer of input/output status information and input/output records with respect to a sort utility invoked from an application program, both the sort utility and application program executing under control of an operating system in a multi-programming environment.

2. Description of the Prior Art

In the prior art, in order to provide a user, such as an application program written in COBOL, with input/output information and data set status, a sort program invoked by the application program returns control to the application program to manage input/output processes executed under control of an operating system, including reads from the input file and writes to the output file. This transfer in control between the sort utility and the caller (application program) results in the expenditure of significant time, which may adversely impact the execution speed of the sort. The advantage is that the operating system passes status information to its caller, in this case, the application program.

In this regard, the current implementation of the SORT verb in the IBM VS COBOL for OS/VS (Program Number 5740-CB1) using OS/VS SORT/MERGE Release 5 (Program Number 5740-SM1), requires that COBOL manage I/O activities, with one record at a time passed over the interface between the application program written in COBOL and the sort utility. This is described, somewhat, in IBM VS COBOL for OS/VS, IBM Publication GC26-3857-2. The OS/VS SORT/MERGE Release 5 parameter list, used when dynamically invoking sort, is described in IBM Publication SC33-4035-7, OS/VS Sort/Merge Programmer's Guide, pages 100–112. This parameter list provides, inter alia, the addresses of any provided exits E15 (for processing input records) and E35 (for processing output records). As will be further described, the use of exists E15 and E35 for processing input and output records, respectively, is quite inefficient, requiring that individual records be passed, along with transfers of control, over the interface between the sort utility and the user, or application, program.

This prior art parameter list also provides the beginning and ending addresses of any MERGE, SORT, RECORD, MODS, DEBUG, and ALTSEQ statements, and an extension to this parameter list known in the art provides beginning and ending addresses for each of SUM, INCLUDE/OMIT, OUTREC, and INREC statements. However, in these prior art parameter lists, no provision is made for passing all control statements, nor exits E18 and E39 (for providing error handling, as will be described more fully hereafter), the latter being separate entities in a library not under control of the application program.

High level language calls, such as from COBOL, to these prior art sort utilities will always provide exits E15 and E35. The application programmer will utilize the sort verb which, when compiled by the high level language compiler, will provide exits E15 and E35, and will include their addresses in the parameter list when invoking the prior art sort utilities. However, when these sort utilities are invoked explicitly by a user not using a high level language compiler, the user (not the compiler) may build its own parameter list directly and invoke sort using a system services LINK, ATTACH or XCTL (transfer control) protocol. If the caller does not, when using LINK, ATTACH or XCTL protocols, provide an exit E15, then these prior art sorts will use the ddname "sortin" (or user chosen replacement) for the input file and will do their own execute channel program (EXCP) or basic sequential access method (BSAM) input processing. Similarly, if exit E35 is not provided, these sorts will do their own output processing using ddname "sortout" (or user chosen replacement). Data definition name (ddname) is a name used by the application program to identify to the operating system and utility programs the names of one or more data sets. These prior art sort utilities do not provide the ability to process user identified sortin and sortout data sets directly on behalf of users invoking sort by use of a high language sort verb, such as in COBOL.

Whitlow, U.S. Pat. No. 4,210,961 describes a sorting system in which blocks of data are read from the input file and written to the output file. However, there is no discussion of selective control of I/O by the sort process and caller, nor of the manner in which, when sort controls I/O, status and error information is preserved and passed to the caller.

SUMMARY OF THE INVENTION

By this invention, a program controlled digital computer is operated under control of a utility, such as a sort program, which manages input/output directly (using very efficient execute channel programs (EXCP) or basic sequential access method (BSAM) facilities of the operating system), but in such a way as to provide to the caller (that is, the application program) the status and error information that the caller requires. This is accomplished by defining an interface between the caller and sort utility enabling the caller to specify the input ddname or the location of a routine to be executed for input and the output ddname or the location of a routine to be executed for output, the locations of routines to be executed upon exit from input/output routines, and data areas for status information. Responsive to the interface, the sort process (1) selectively calls input/output exit routines provided by the caller, passing one record at a time over the interface, or provides to the the operating system its own channel program for input/output with respect to a plurality of records, and (2) provides to the operating system information enabling the operating system to communicate error and status information directly to the application program.

Thus, in accordance with the invention, a method and means is provided for operating a computing apparatus under control of a utility which processes records in an input file to provide an output file in response to a request from a high level application program. The utility receives control from the application program, which dynamically invokes the utility by a request including a parameter list, the parameter list selectively including the ddnames of the input file and output output file, and optionally referencing one or more error recovery routines. The utility establishes addressability to any error recovery routines, for use by operating system services if an error occurs when accessing the input and/or output files, and invokes operating system services to read from the input file a plurality of records to be processed, processes the records, and then invokes operating system services to write the processed records to the output file.

In accordance with a further aspect of the invention, a method and means is provided for operating a computing apparatus under control of a sort program for sorting a plurality of records in an input file into an output file in response to a request from an application program. The method comprises the steps of receiving control from said application program; obtaining from said request the ddnames of said input file and said output file; reading from said input file a plurality of records to be sorted; sorting said records; writing the sorted records to said output file; and then returning control to said application program.

BRIEF DESCRIPTION OF THE DRAWING

FIGS 5, 5a and 5b are a detailed schematic diagram illustrating the control blocks, routines, and data areas defining the interface between an application program and sort program.

DESCRIPTION OF THE PREFERRED EMBODIMENT

Figure 1:
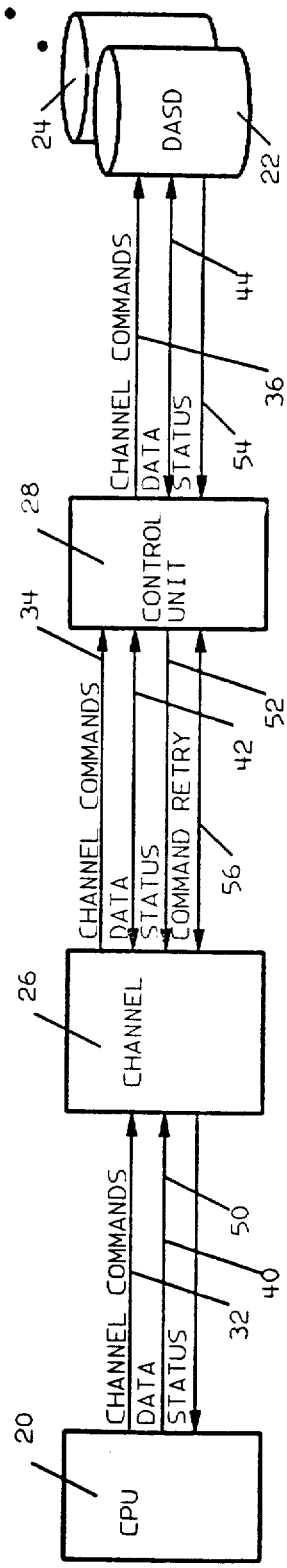
FIG. 1 is a diagrammatic illustration of a system environment.

Referring to FIG. 1, a description will be given of the general system environment in which the sort of the invention is practiced. The method of this invention is executable upon a computing system of the type including one or more CPU's, eaching having a main store, input/output channel, control unit, direct access storage devices, local addressable clocks, and other I/O devices coupled thereto, such as is described in Amdahl et al, U.S. Pat. No. 3,400,371, issued Sept. 3, 1968, and entitled "Data Processing System". The Amdahl system includes as a resource, all of the facilities of either the computing system or of an operating system running thereon which are required for the execution of a process including the method of this invention. Typical resources include a main store, I/O devices, the CPU, data sets, and control or processing programs. The central processing unit (CPU) may be any processor such as an IBM System/370, 303x, 43xx, 308x processor, or any processor executing in extended architecture (XA) mode. XA mode provides for 31-bit addressing of storage, as distinguished from the 24-bit addressing in System/370 architecture, and is further described in MVS/Extended Architecture System Programming Library (SPL): 31-Bit Addressing, IBM publication GC28-1158-0. The sort of the invention may execute, for example, under an operating system (OS) such as the IBM OS/VS1 release 7.0, OS/VS2 MVS release 3.8, MVS/XA, or any of these running as hosts under VM/370 or VM/XA Migration Aid. Storage devices 22, 24, for storing sortin (the input file for sort), sortout (the output file from sort), and sortwk (the workfile for sort) data sets, may be, for example, and depending upon the operating system selected, any of IBM tape units of the 2400 series and 3400 series, or direct access storage devices (DASD) or facilities (DASF) of the 2314, 3330, 3340, 3350, 3375, 3380 (with or without the Speed Matching Buffer) series or the 3850 Mass Storage Subsystem.

Referring to FIG. 1, in a input/output (I/O) subsystem including DASD units 22, 24, a control unit 28 interconnects a CPU channel 26 and the devices 22, 24. Data is communicated between these units on data bus 40, 42, 44 under the control of channel command lines 32, 34, and 36. Status information is communicated from devices 22, 24 over lines 50, 52, 54 back the control unit 28, channel 26, and CPU 20, and line 56 provides command retry signals from control unit 28 to channel 26. One important aspect of this invention is the provision, hereinafter described, for providing such status information received over line 50 and CPU 20 directly to a user, or application program. Channel commands are communicated from CPU 20 over lines 32, 34 and 36. Another important aspect of this invention is the provision, hereinafter described, for controlling input/output processing against the sortin and sortout files from either a high-level application program or the sort program.

Figure 2:
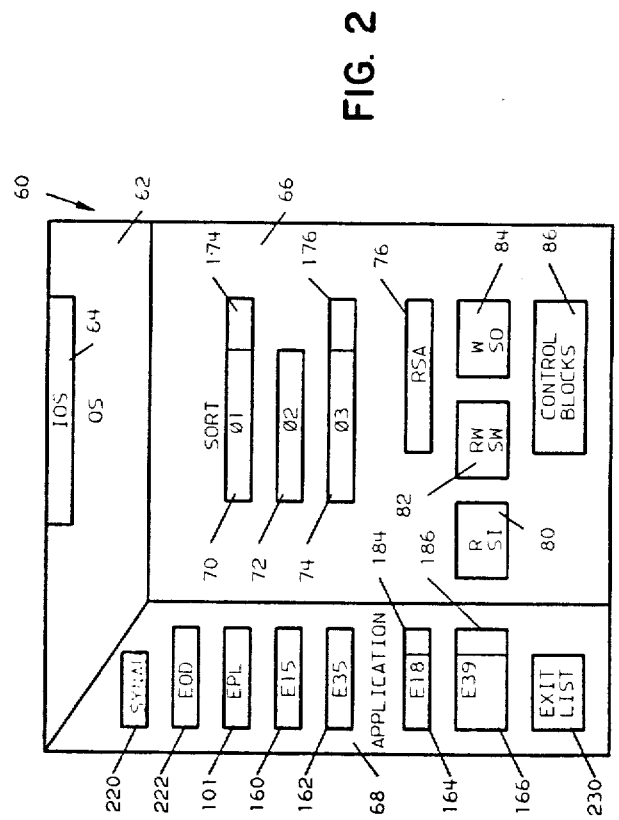
FIG. 2 is a diagrammatic illustration of the virtual storage address space of the central processor of FIG. 1.

CPU 20 includes a virtual storage 60, a map of which is diagrammatically set forth in FIG. 2. Herein are stored electrical signals representing operating system 62, including input/output subsystem interface control program 64, sort routine 66, and application program (sometimes referred to as the user) 68.

The interfaces between operating system 62, sort 66, and application 68, essential to an understanding of the invention, include the following structures managed by application 68: extended parameter list 101, exit E15 routine 160 for passing or changing input records, exit E35 routine 162 for passing or changing output records, exit E18 routine 164 for providing input error handling, exit 39 routine 166 for providing output error handling, SYNAD routine 220, end of data routine 222, input data set control parameter list 184, output data set control parameter list 186, and exit list 230. Hereafter, these will be described in greater detail in connection, primarily, with FIG. 5.

Sort routine 66 includes the following structures: initialization and string generation phase 1 code 70, intermediate merge phase 2 code 72, final merge phase 3 code 74, record storage area 76, read sortin channel program 80, read/write sortwk channel program 82, write sortout channel program 84, control blocks 86 (including pointers to areas 210, 220, 222 in application 68 built by sort routine 66 during the initialization phase 70 and updated as necessary to contain information from exits 164 (E18) and 166 (E39), sortin routine 174 for execute channel program (EXCP) or basic sequential access method (BSAM) processing of the input data set, and sortout routine 176 for EXCP or BSAM processing of the output data set. Hereafter, these will be described in greater detail in connection, primarily, with FIG. 5.

The interface between sort 66 and user 68 is defined, or built, by application 68 establishing structures, including 101, 160, 162, 184, 186, 220, 222, and 230, for subsequent use by sort 66. Applications 68, which dynamically invoke sort 66, may reside above or below the 16 megabyte (MB) virtual addressing area 61 in the XA architecture, and may execute using 24-bit or 31-bit addressing.

Figure 3:
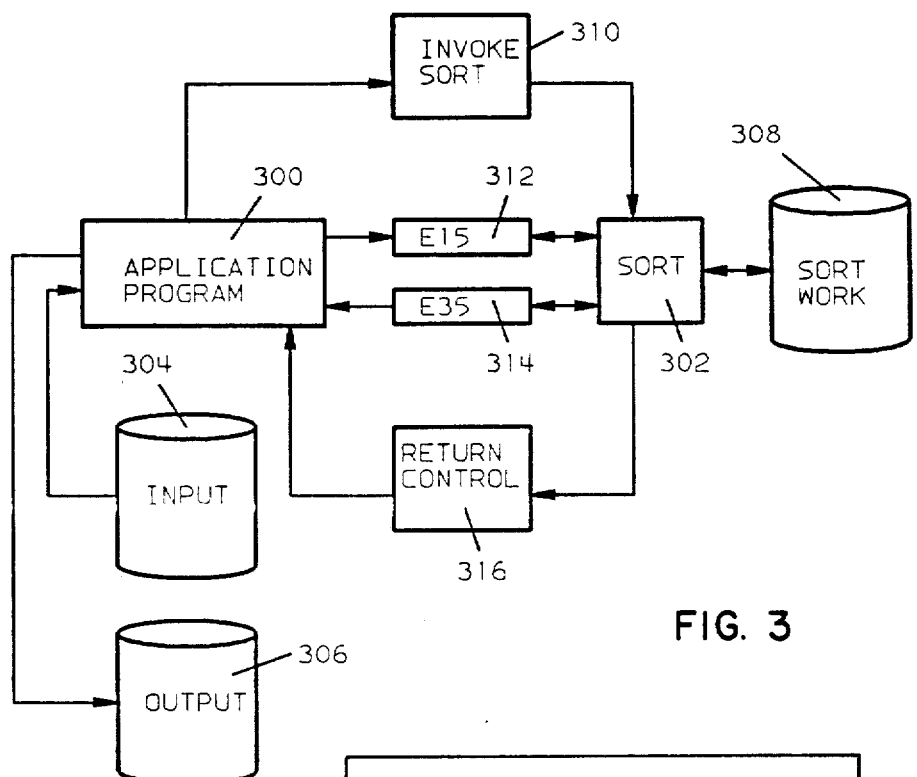
FIG. 3 is a schematic diagram illustrating the interface and flow of control between an application program and sort program in accordance with a first technique.

Referring now to FIG. 3, a description will be given of E15/E35 processing of input/output files as is presently done in the prior art IBM OS Sort Release 5 product and as will be supported as an available technique in accordance with the present invention. Application program 300 provides in routine 312 exit E15 code for processing input records, and in routine 314 exit E35 code for processing output records. Application 300 then invokes sort by executing code 310, which passes control to sort routine 302. When sort 302 is ready to receive an input record, it invokes exit E15 code 312, passing control back 316 to application program 300, which causes a record or block of records to be read in from input file 304. Using E15 code 312, application program passes the input record, one record at a time, back to sort 302, and returns control 310 to sort 302. This process of passing control 310, 316 back and forth between application program 300 and sort 302 occurs for each input record. While it is an inherently slow process, one advantage is that application program 300 operates as the caller of input/output system code 64, and receives directly therefrom status information communicated via lines 50, 52, 54 from input device 22 (304). Similarly, exit E35 is executed for each output record, with control passing from sort 302 to application 300 and back for writing each output record to output device 306. Sort work (sortwk) files 308 are managed by sort 302 to store strings of records generated during phases 1 and 2.

Figure 4:
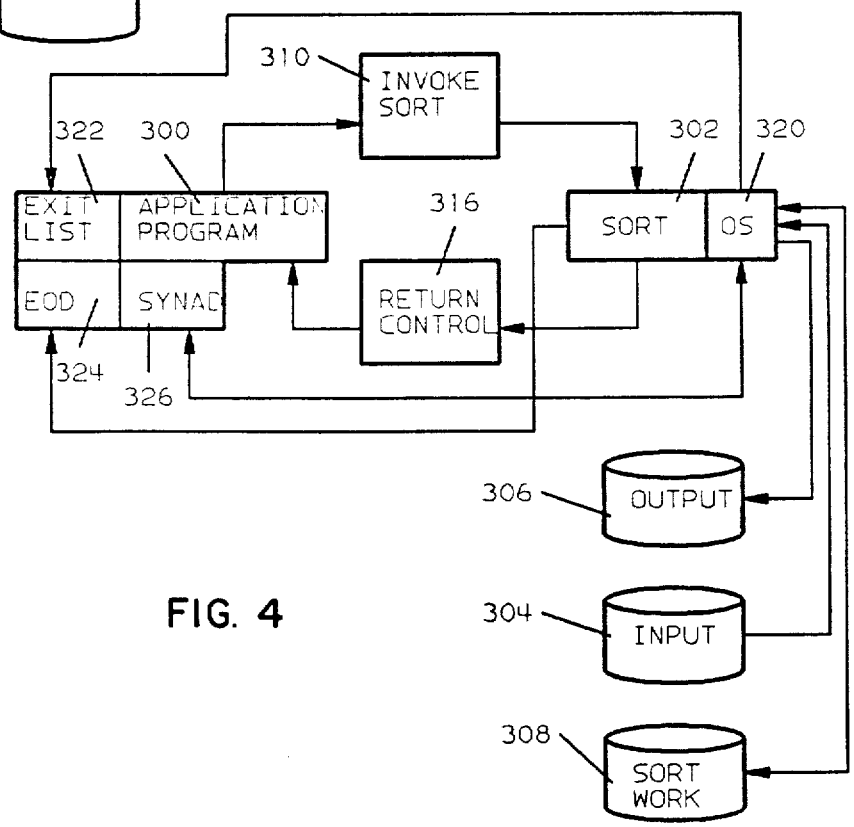
FIG. 4 is a schematic diagram illustrating the interface and flow of control between an application program and sort program in accordance with a second, faster technique.

Referring now to FIG. 4, an overview of the apparatus and method of the invention for dynamically invoking sort 302 from application 300, with sort 302 managing the reading and writing of records with respect to the input data set 304 and output data set 306, will be described. The process herein explained is referred to as the fast sort option, meaning that sort 302 directly manages input and/or output by interaction with operating system (OS) 320, rather than by passing control back to user 300, as is done in the process explained in connection with FIG. 3. As in FIG. 3, sortwk files 308 are managed by sort 302, which utilizes functions provided by OS 320, to store strings of records generated during phases 1 and 2 (when there is insufficient room in record storage area (RSA) to hold all of the records in input data set 304). In this instance, application program 300 establishes, among other structures previously described, exit list 322, end of data (EOD) routine 324, and synchronous error (SYNAD) routine 326. Application program 300 executes invoke sort code 310, thereby passing control to sort 302. Sort 302, utilizing EXCP or BSAM, invokes OS 320 functions for reading data in from input data set 304, and writing output records to output data set 306. As will be more fully described hereafter, sort 302 invokes EOD routine 324 when the end of data is reached, OS 320 passes error and status information to application program 300 using exit list 322 and SYNAD 326, and sort 302 establishes the necessary linkage between OS 320 and user 300.

Referring now to FIG. 5, a more detailed description will be given of the control structures implementing the interfaces between sort 66, application 68, and operating system 62.

When sort 66 is invoked by caller 68, register R1 100 has been set by caller 68 to point to the location in virtual storage 60 containing extended parameter list 101, the contents of which are summarized in Table 1. Extended parameter list 101 was, previous to invocation of sort 66, established by user 68 with the information necessary to pass to sort 66 all of the sort control statements supported by sort 66, and to indicate the addressing mode to be in effect when an exit loaded by user 68 is entered by sort 66.

TABLE 1

EXTENDED PARAMETER LIST

| Offset Decimal | Bit 0,1–31 | |
|---|---|---|
| 102 | 0 | 0,Address of control statements area (zeros if none) |
| 112 | 4 | f,Address of E15 or E32 routine (zeros if none) |
| 116 | 8 | f,Address of E35 routine (zeros if none) |
| 118 | 12 | User exit address constant (zeros if none) |
| 120 | 16 | Address of ALTSEQ translation table (zeros if none) |
| 130 | 20 | Address of STAE area field (zeros if no STAE routine) |
| 138 | 24 | f,Address of E18 routine (zeros if none) |
| 142 | 28 | f,Address of E39 routine (zeros if none) |
| 144 | 32 | X'FFFFFFFF' | where for an MVS/XA operating system environment,
f=0 means enter the exit with 24-bit addressing in effect
f=1 means enter the exit with 31-bit addressing in effect Control statements pointer 102 provides the address of control statements list 108, an area containing the sort/merge control statements, if any. Control statements list 108 includes length field 104, containing the length of the character string to follow, and a character string illustrated as including portions 124, 126. This character string contains images of sort/merge control statements to be used at execution time, with each control statement separated by one or more blanks. Sort/merge control statements include, for example, those described in IBM OS/VS Sort Programmer's Guide, IBM Publication SC33-4035, and others, as follows: ALTSEQ, for specifying modifications to the IBM EBCDIC collating sequence; DEBUG, for use when diagnostic information is required for debugging; END, for causing sort 66 to discontinue reading the input file; INCLUDE, for specifying that only records whose fields meet certain specified criteria be included; OMIT, for specifying that records whose fields do not meet certain criteria be deleted; INREC, for specifying how records are to be reformatted before they are sorted; MERGE, for providing the same information as a SORT statement if the application is a merge; MODS, for including user routines in the sort application; OPTION, for overriding installation defaults and for providing optional information; OUTREC, for specifying how records will be reformatted before they are written to sortout; RECORD, for providing record length and type information; SUM, for specifying that summary fields in records with equal control fields be summarized in one of the records, and that the other records be deleted; and SORT, for providing information about control fields and data set size. Of these, the most pertinent to the dynamic invocation aspect of the invention is illustrated by the OPTION control statement, showing in field 124 the string "SORTIN=-DD—NAME—OF—INPUT—DATA—SET,", and in field 126 the string "SORTOUT=-DD—NAME—OF—OUTPUT—DATA—SET". By these control statements, application program 68 specifies the names of the data sets containing the input file and the output file for use by sort 66 when executing the fast sort option.

The syntax of the SORTIN control option is "SORTIN=ddname" or "SORTIN=SORTIN". It specifies the DDname to be used for sort input when sort 66 is dynamically invoked. The standard default is SORTIN, or ddnmIN if SORTDD=ddnm was specified. SORTDD=ddnm is an option control card used to supply the first four characters for DDnames SORTIN and SORTOUT when sort 66 is invoked more than once by the same caller 68. This option is used if it is specified on an OPTION control statement in control statements list 108.

The syntax of the SORTOUT control option is "SORTOUT=ddname" or "SORTOUT=SORTOUT". It specifies the DDname to be used for sort output when sort 66 is dynamically invoked. The standard default is SORTOUT, or ddnmOUT if SORTDD=ddnm was specified. This option is used if it is specified on an OPTION control statement in control statements list 108.

Exit E15 address field 112 specifies the addressing mode and the address of the exit E15 routine 160, if any. Exit E35 address field 116 specifies the addressing mode and the address of the exit E35 routine 162, if any.

Address constant field 118 specifies the user exit address constant, if any. This field is passed by sort 66 to user exits E15 and/or E35, and is used to point to a parameter list or work area created by the user (not shown). For dynamically invoked sort, the user can initialize the user exit address constant 118. It will be passed to the first exit as it is received from the caller (or user), and passed to the second exit as it is received from the first exit. The user can, for example, GETMAIN an area in the E15 routine and pass the address of the area to the E35 routine even though they are not in main storage at the same time. (Virtual storage 60 includes real and pageable storage.) When invoking sort using 31-bit addressing mode, user address constant field 118 is passed to exit E15 in the E15 parameter list, such that the E15 parameter list will include the address of the new record concatenated to the user exit address constant. Exit E15 can change the user exit address constant, and sort 66 passes it exactly as it was received from the E15 exit. The user address constant field is passed to exit E35 in the E35 parameter list, such that the E35 parameter list will include the address of the record leaving sort 66, concatenated to the address of the record in the output area, concatenated to the user exit address constant.

Collating sequence table address (ALTSEQ) 120 is a pointer to translate table 122, a table provided by user 68 instead of an ALTSEQ control statement, if any, which, if provided, overrides any translate table given at installation time.

Status area address pointer field 130 provides a pointer to status area address field 132, which in turn points to status area 134. Status area 134 is a specify task asynchronous exit (STAE) (for VS1) or ESTAE (for MVS) save area for use if the STAE or ESTAE routine receives control in the event of abnormal termination of sort, and the STAE or ESTAE work area is to be saved.

Exit E18 address 138 specifies the addressing mode and the address of the user supplied E18 exit routine 164, if any. Exit E39 address 142 specifies the addressing mode and the address of the user supplied E39 exit routine 166, if any. Field 144, containing X'FFFFFFFF' terminates the extended parameter list 101. By use of extended parameter list 101, the caller can pass 31-bit addresses or "clean" 24-bit addresses to sort 66, can specify the addressing mode to be in effect when sort 66 enters a caller-loaded exit, and the caller can code all of the sort control statements in the callers program. Table 2 sets forth a pseudo-code description of the manner in which extended parameter list 101 is processed by sort 66 to establish the control structure to be described hereafter with respect to FIG. 5. This processing of the parameter list 101 occurs during an initialization phase, just after sort 66 is invoked (step 400, FIG. 6 and before step 440, FIG. 8).

Further referring to FIG. 5, if exit E15 address 112 is specified, when an input record is to be read, sort code 150 enters E15 routine 160 to pass control to the caller for processing the input data set. If no exit E15 address 112 is provided, sort code 170 executes its own EXCP or BSAM procedure 174 for reading the data set specified by SORTIN option statement 124. EXCP processing is explained in the IBM System Programming Library: Data Management, IBM publication number GC26-3830-3, at pages 61–100.1. This input process is further set forth in the pseudo-code description of Table 3, and in FIGS. 8 and 9. By these techniques, sort 66 can pass to OS 62 the CCW chain optimizing the input/output processing of the input/output datasets. A typical channel program, or CCW chain, for reading a plurality of blocks with one EXCP, is set forth in FIG. 11, which will be described hereafter.

Figure 12:
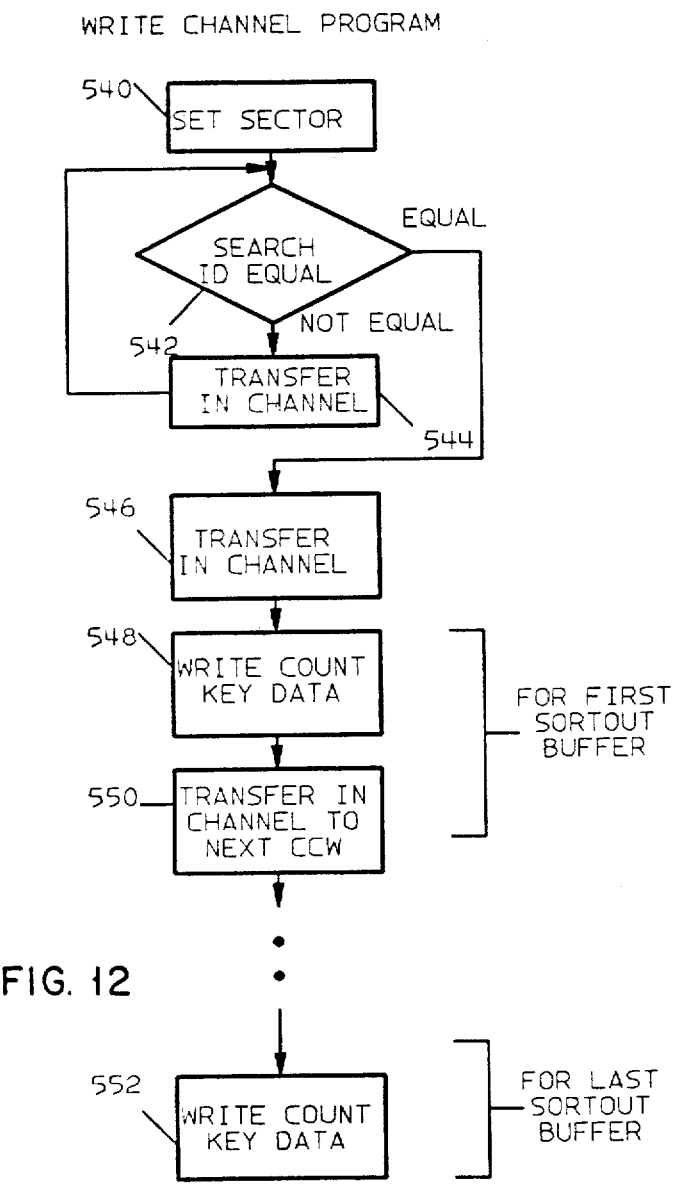
FIG. 12 is a flow chart of a channel program for writing data records to an output device.

If exit E35 address 116 is specified, when an output record is to be written, sort code 152 enters E35 routine 162 to pass control to the caller for processing the output data set. If no exit E35 address 116 is provided, sort code 172 executes its own EXCP or BSAM procedure 176 for writing to the data set specified by the SORTOUT option statement 126. This output process is further described in pseudo-code in Table 4, and in connection with FIGS. 8 and 10. Procedure 176 will typically include a channel program, such as that set forth in FIG. 12, which will be described hereafter.

Referring still to FIG. 5, application 68 may provide E18 routine 164 and/or E39 routine 166, specifically tailored to its own requirements. Previously, such routines were provided in a library, not tailored to the application—which could therefore not be assured of getting I/O error and data set status information.

If exit E18 address field 138 is provided in extended parameter list 102, sort 66, 154 invokes exit E18 routine 164, a routine supplied by user 68. Exit E18 routine 164 loads register R1 (180) with address X1, the address of input data set control parameter list 184, and returns back to sort 154. Parameter list 184 includes SYNAD address 190, exit list EXLST address 192, and end of data (EOD) address 194. These are set by exit routine 164, which was provided by caller 68. Sort 154 will then process the fields in list 184 by placing them in several control blocks for subsequent use by sort 66 during processing of the sortin data set. One of those control blocks is the DCB for input 210, which is established by sort 66 and described by COMINDCB 218. DCB for input 210 I/O block (IOB) 216 contains control structures used by sort 170 when doing EXCP processing 174. Thus, control block IOB 216 has the initial CCW's which are chained by a transfer in channel (TIC) to further CCW's required to perform EXCP process 174, as will be further described in connection with FIG. 11. SYNAD address 190 is placed into DCBSYNAD 212, EXLST address 192 into DCBEXLST 214, and EOD address 194 into COM18ND 224. COM18ND 224 is the address of EOD routine 222, which is supplied by caller 68 for use by sort 66 when the end of sortin data set is encountered during input. SYNAD routine 220 is the routine supplied and built by caller 68 to process errors that occur during processing of the sortin data set. DCBEXLST 214 is the address of exit list 230, which contains the addresses of various user 68 supplied functional routines. These functional routines are delimited by a functional code identifier, and the address of the functional routine. Examples of such routines are OPEN 232, with address 234 of open exit routine 236, CLOSE 240, with address 242 of close exit routine 244, and EOV 246. Open exit routine 236 and close exit routine 244 are supplied by user 68 for use by sort 66 when the input data set is opened, or closed, respectively.

If exit E39 address field 140 is provided in extended parameter list 102, sort 66, 156 invokes exit E39 routine 166. It loads register R1 (182) with address X2, the address of output data set control parameter list 186, and returns control to sort 156. Parameter list 186 includes SYNAD address field 196 and exit list EXLST address 198. These are set by exit routine 166, which was provided by caller 68. Sort 156 will then process the fields in list 186 by placing them in DCB for output 200, a control block initially established by sort 66 and described by COMUTDCB 208 for use by sort 66 during processing of the sortout data set. It contains control structures and channel command routines for use by routine 172 when doing EXCP processing 176. Thus, control block 200 contains in IOB 206 the initial CCW's which are chained by a transfer in channel (TIC) to further CCW's required to perform EXCP process 176, as will be further described in connection with FIG. 12. SYNAD address 196 is the address of a SYNAD routine (not shown, but like 220) provided by user 68 for processing errors encountered during writing the sortout data set. It is placed by sort 156 into DCBSYNAD 204. EXLST address 198 is the address of an exit list (not shown, but like 230) provided by user 68, containing the addresses of various user 68 supplied functional routines for processing the sortout data set. It is placed by sort 156 into DCBEXLST 202.

Figure 6:
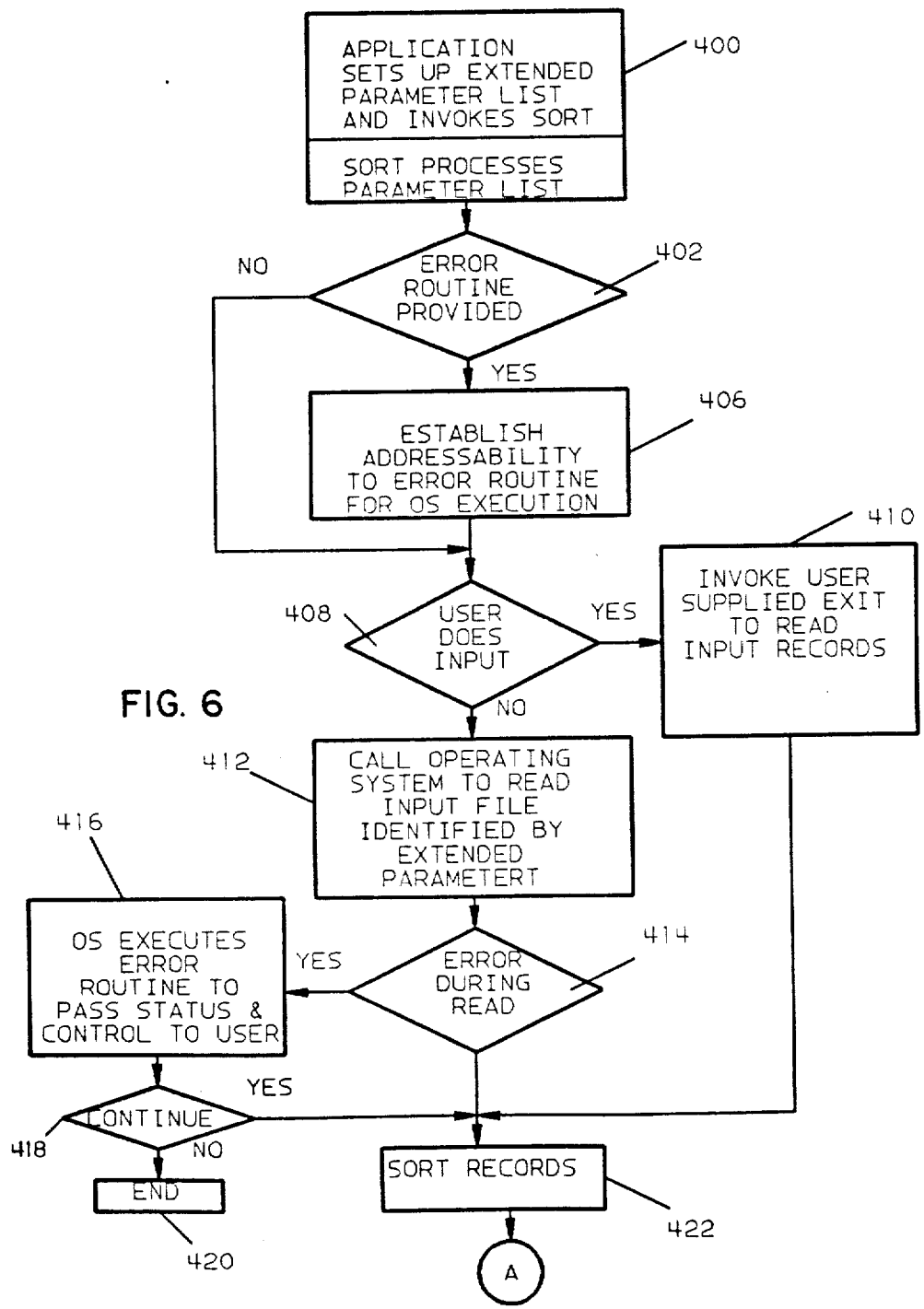
FIGS. 6 and 7 are a flow diagram of the method of the invention, illustrating in particular the steps for transferring status, or error, information to the application program.

Referring now to FIG. 6, a description will be given of the method of the invention for managing the sort-/application interface in the event of an error during reading of the sortin data set. In step 400, application 68 sets up extended parameter list 101, and invokes sort 66, which processes the parameter list according to the procedure set forth in Table 2. Referring to Table 2, lines 1 through 5 relate to initialization of sort 66 when invoked from a job control language (JCL) environment—without use of extended parameter list 101, which may be used if sort 66 is dynamically invoked. In lines 6 through 62 the parameter list is scanned to identify those fields having significant entries. In lines 63–74, if control statements were passed, these are examined to identify the sortin and sortout data set names. In lines 75–88, if a sortin data set was named in the control statements, DCB and IOB control blocks 210 are built. In lines 89–101, if a sortout data set was named in the control statements, DCB and IOB control blocks 200 are built. In lines 102–111, if an exit E18 routine was identified in the parameter list, that exit is called, and the parameter list it supplies is processed. In lines 112–120, if an exit E39 routine was identified in the parameter list, that exit is called, and the parameter list it supplies is processed.

Referring again to FIG. 6, as previously described, sort 66, in step 402, determines if application 68 provided an error routine 220 by examining exit E18 address field 138. If field 138 so indicates, in step 406 (see steps 102–111 in Table 2) sort 66 establishes addressability to error routine 220 by executing E18 routine 164 and storing, or saving, SYNAD address 190 into DCBSYNAD 212, as previously described.

In step 408 (see also, Table 2 steps 18–23), sort 66 examines exit E15 address field 112 in extended parameter list 101 to determine if application 68 will manage input. If an exit E15 address is provided, in step 410 sort 66, 150 invokes user supplied exit E15 routine 160 to read in the input records. Otherwise, in step 412, sort 66, 170 invokes EXCP or BSAM process 174 to read in the sortin data set identified in the SORTIN parameter 124 of the option control statement 108. (This is further described in Table 2 at lines 76–88, and in Table 3 at lines 1–15, 20–30.)

In step 414, if no error occurs during input of the sortin data set, control passes to step 422 for sorting the input. If an error occurs, and if an error routine 220 has been provided by application 68, that routine is executed at step 416 to provide to application 68 the status and error information available from OS 62. The application can, in step 418, determine if the sort should continue at step 422, or terminate 420. (See also Table 3, lines 18 and 30.)

Figure 7:
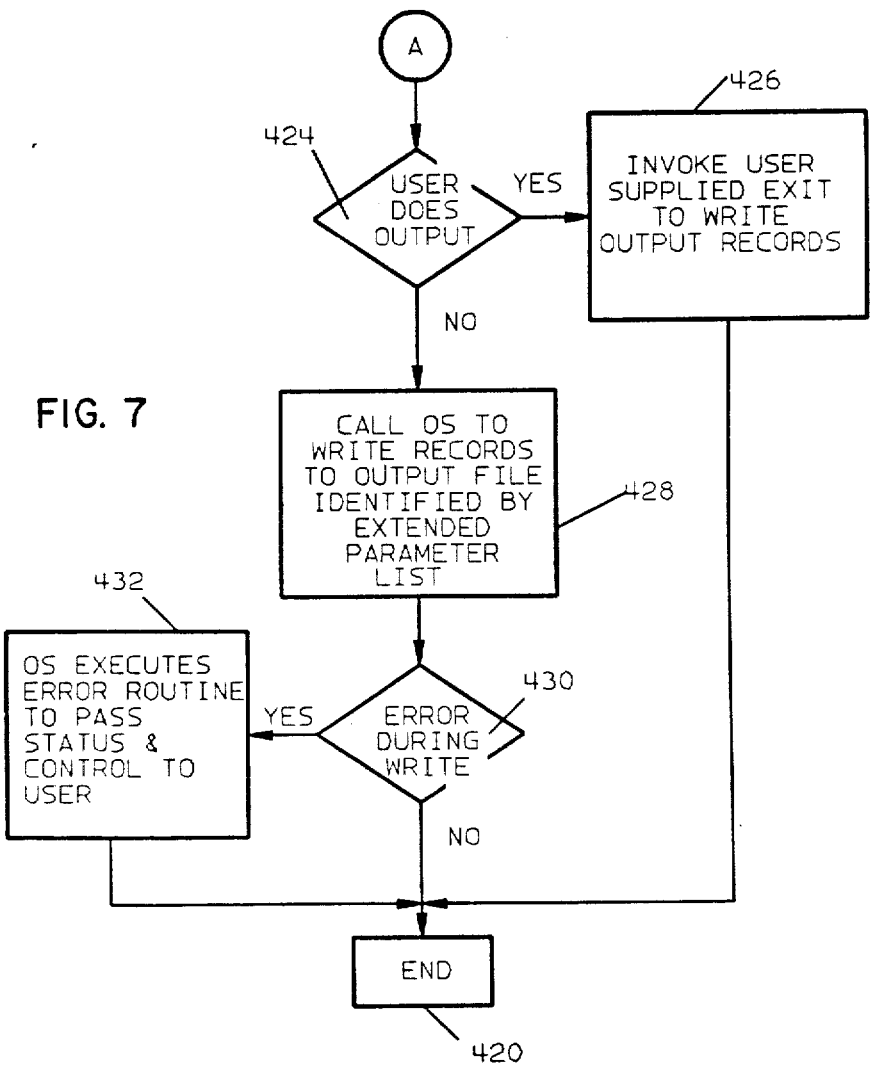

Referring to FIG. 7, processing of errors encountered during write to the sortout data set is described. (This is further described in Table 4, lines 1–25.) At step 424, sort 66 determines, by reference to exit E35 address field 116 in extended parameter list 101, if application 68 will manage output of sorted records to the sortout data set. If so, in step 426 sort 66,152 invokes exit 35 routine 162 to write out the records. If not, in step 428, sort 66, 172 executes EXCP or BSAM output routine 176, which calls OS 62 to write the sorted records to the sortout data set identified in SORTOUT option control statement 126, using the CCW chain begun in IOB 206 and further described in connection with FIG. 12.

In step 430, if an error occurred during write to the sortout data set, in step 432 the SYNAD routine provided by application 68 and addressed by DCBSYNAD 204 is executed by OS 62 to pass status and control to application 68. Otherwise, the sort process ends 420.

Figure 8:
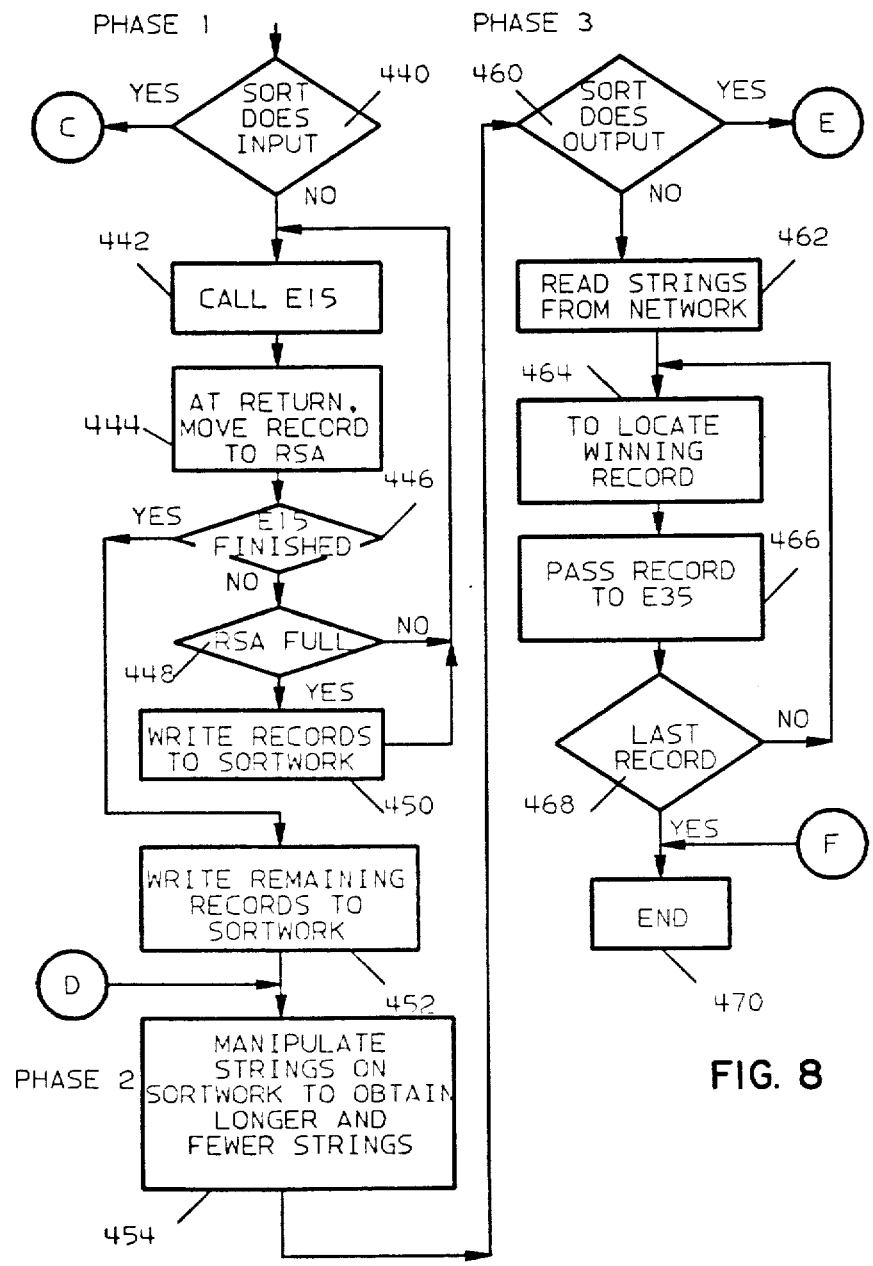
FIGS. 8, 9, and 10 are a flow diagram of the method of the invention, illustrating in particular the steps of invention as implemented during the three phases of a sort process: phase 1 (string generation), phase 2 (intermediate merge), and phase 3 (final merge).
Figure 9:
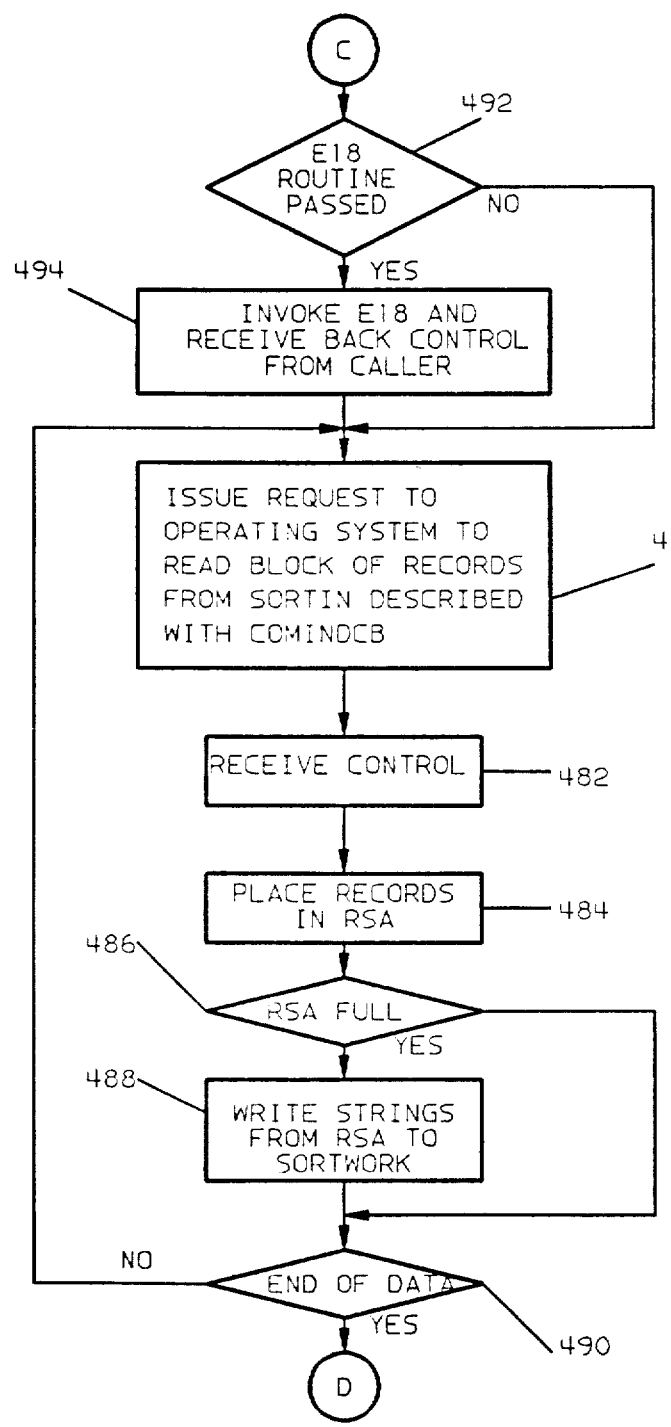
Figure 10:
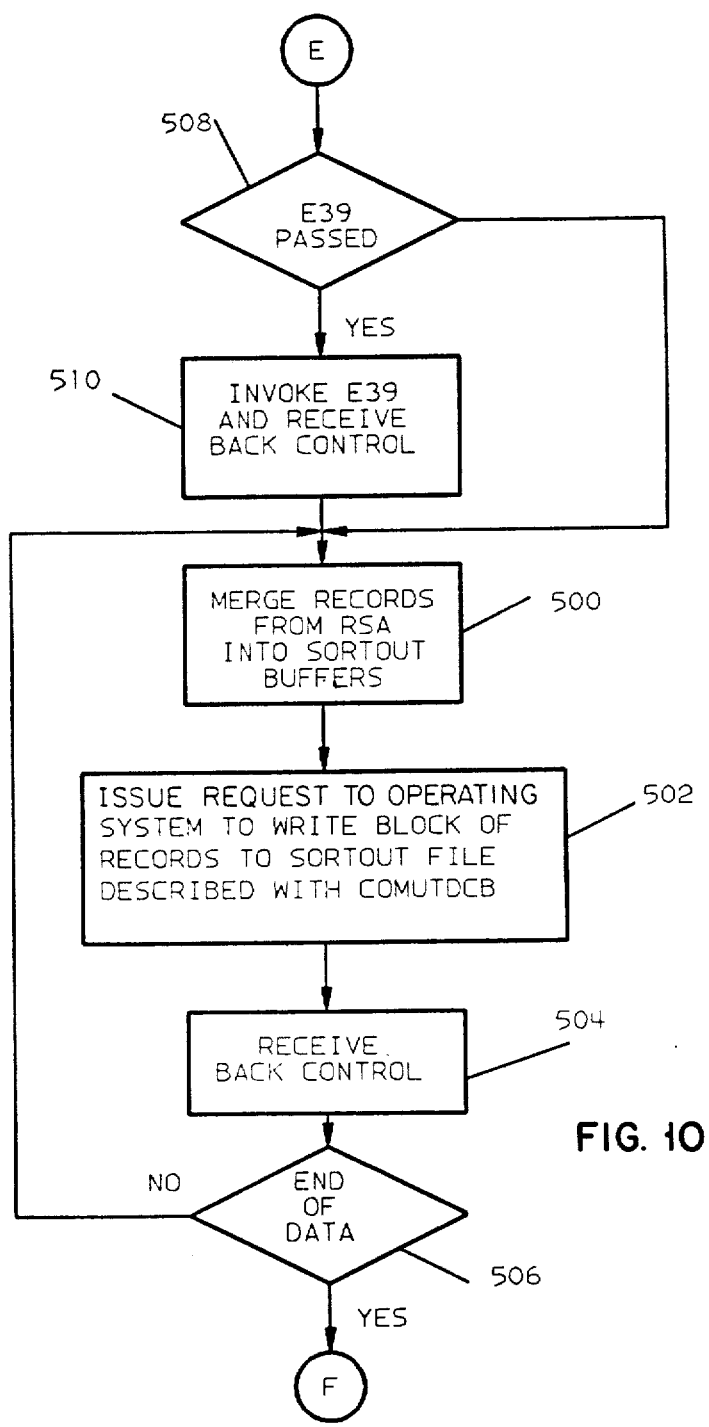

Referring now to FIGS. 8–10, a description of the method of the invention for reading and writing to sortin and sortout data sets, respectively, selectively under control of application 68 and sort 66, will be described.

Typically, a sort process comprises three phases and an initialization phase. In accordance with this invention, during the initialization phase, if sort is dynamically invoked, the extended parameter list 101 is processed in accordance with the procedure previously discussed in connection with Table 2. Thereafter, during phase 1, the sortin data set is read in and strings of ordered records organized in storage and/or on external devices (sortwork). During phase 2, referred to as the intermediate merge phase, these strings are manipulated to form longer and fewer strings. And during phase 3, the final merge phase, the strings generated during phase 2 are written to the sortout data set.

In accordance with this invention, the reading and writing of records with respect to the sortin and sortout data sets may be managed selectively under control of application 68 or sort 66, as determined by application 68 and indicated by the presence or absence of address fields in exit E15 address field 112 (for input) and exit E35 address field 116 (for output). Further, in accordance with this invention, the address mode bits in extended parameter list 101 fields 116, 118 indicate whether, for example, 24 bit or 31 bit addressing is to be used when an exit routine 160, 162 is invoked.

In step 440, if user 68 has provided exit E15 routine 160, sort 66 calls that routine to receive a record from sortin. User 68 calls OS 62, routine 64 of which does the actual read using channel programs provided, generally, in a library routine (not shown). In step 444, upon return of control from application 68, sort 66 moves the input record from the location signalled by application 68 into record storage area (RSA) 76 in main storage 60. In steps 446, 448, and 450, if exit E15 processing 160 is not completed, and if RSA 76 is not full, sort 66 issues another call 442 to exit E15 routine 160 to read the next record in from sortin. As RSA 76 fills, in step 450 blocks of records are written to the sortwork data set on external devices 22. After the sortin data set has been read, as determined at step 446, the records remaining in RSA 76 may be written to sortwork, and processing continues to phase 2 at step 454.

During phase 3, at step 460, if user 68 has provided an exit E35, in step 562 sort 66 reads in the strings to be finally merged from sortwork 152, in step 464 determines the winning record (next record for output), and in step 466 passes that record to exit E35 routine 162. Steps 464, 466, and 468 are repeated until the last record has been written to sortout, whereupon the sort process ends at step 470, and control is returned to caller 68.

Figure 11:
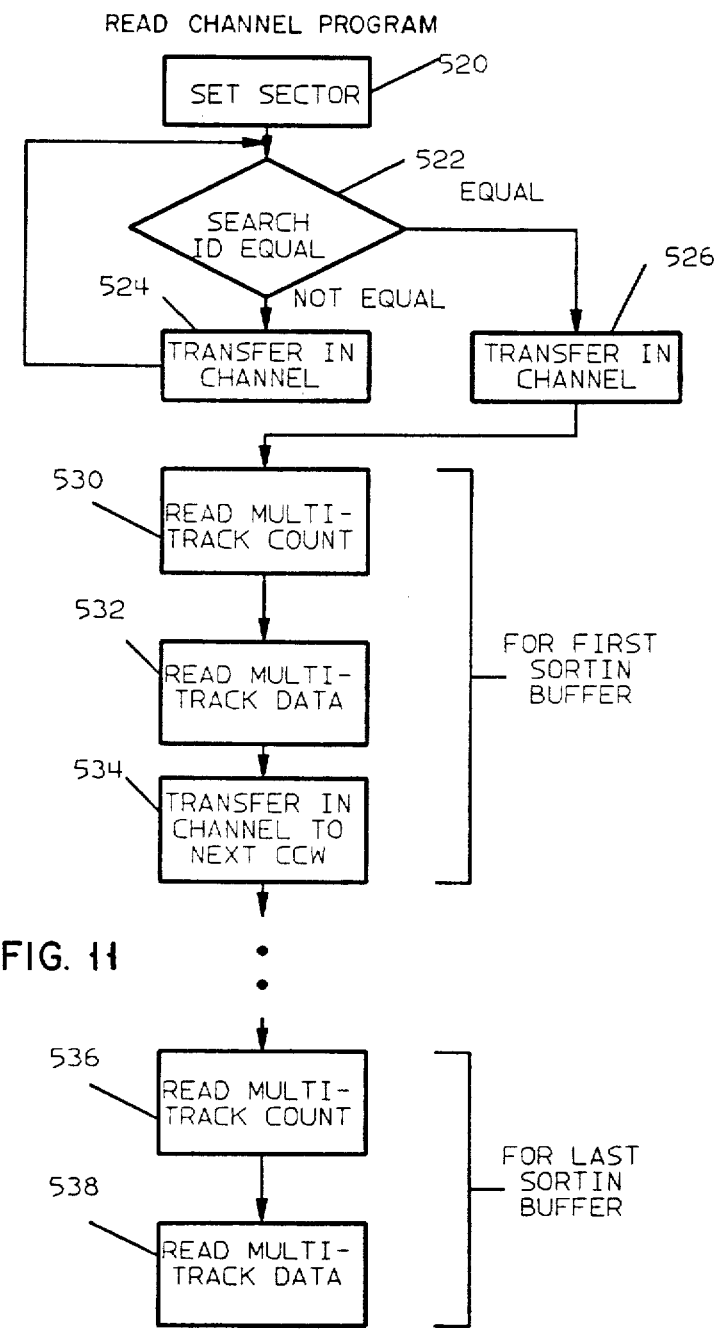
FIG. 11 is a flow chart of a channel program for reading data records from an input device.

Referring now to FIG. 9, if in step 440 (FIG. 8) it was determined that sort 66 is to do input processing without invoking a user supplied E15 exit routine, then in step 480 sort 66, 170 (executing code at 170 and 206) issues a request to OS 62 to read a block of records from sortin 22 referenced by COMINDCB 218. In FIG. 11 is set forth a typical READ channel program, such as may be provided to OS 62 by sort 66. In FIG. 11, the SET SECTOR 520, SEARCH ID EQUAL 522, TIC 524 and TIC 526 commands initiating the READ channel program are provided in IOB 216, with TIC 526 transferring control to code (not shown) outside of IOB 216, containing for each sortin buffer provided in main storage 60 the CCW's READ MULTI-TRACK COUNT 530, READ MULTI-TRACK DATA 532, and TIC TO NEXT CCW 534, and for the last sortin buffer the CCW's READ MULTI-TRACK COUNT 536 and READ MULTI-TRACK DATA 538. Referring further to FIG. 9, sort 66 receives back control from OS 62 at step 482, and in step 484 places the records in RSA 76. If, in step 486, it is determined that RSA 76 is filled, in step 488 strings of records are written from RSA to sortwork on devices 22, 24. In steps 490 and 492, after the sortin file has been read in, and if an exit E18 routine 164 was passed by user 68 to sort 66, then sort 66, 170 invokes that routine. When control is received back, processing continues into phase 2 at step 454. If an error occurred during the read process under control of OS 62, then control would not have returned to sort 66 at step 494 until OS 62 had invoked the procedure at step 416 (FIG. 6).

Referring now to FIG. 10, if in step 460 (FIG. 8) it was determined that sort 66 would do output, and in step 508 it is determined that user 68 had passed exit E39 166, then exit E39 166 is invoked to allow the user to pass output dataset control parameter list 186 to sort 156. In step 500, sort 66 merges records from strings in RSA 67 into sortout buffers in main storage 60, and in step 502 issues a request to OS 62 to write out to the sortout data set on external devices 22, 24 the output records pointed to by COMUTDCB 208. In issuing the request to OS 62, sort 66 will provide a channel program comprising a write channel program, such as set forth in FIG. 12. Herein, this channel program will be contained within or referenced from IOB 206, and includes SET SECTOR 540, SEARCH ID EQUAL 542, TIC 544, TIC 546, and for the first n−1 (where n is the number of sortout buffers) sortout buffers WRITE COUNT KEY DATA 548 and TIC TO NEXT CCW 550, and for the last (nth) sortout buffer WRITE COUNT KEY DATA 552. Upon receiving control in step 504, and if end of data has occurred, then control passes to step 470, and sort 66 is finished. If an error occurred during the write process under control of OS 62, then control would not have returned to sort 66 at step 504 until OS 62 had invoked the procedure of step 532 (FIG. 7).

TABLE 2

| PROCESS PARAMETER LISTS |
| --- |
| If JCL Invoked Then |
| do; |
| Set Flag saying JCL Invoked |
| Process Parameters from JCL EXEC card |
| end; |
| Else {Dynamically Invoked} |
| Do; |
| If 31-Bit parameter list 101 passed Then |
| Do; |
| Set Flag indicating 31-bit parameter list |
| If control statements pointer 102 is not 0 then |
| If length field 104 pointed to by controls statements pointer 102 is not 0 |
| do; |
| save starting address 106 of control statements 108 |
| save length 104 of controls statements 108 |
| end; |
| If this was the last entry, goto End__of__Parameter__List |
| {Process E15 Entry Point & Addressing mode} |
| If E15 Address 112 was passed (is non-zero) Then |

TABLE 2-continued
PROCESS PARAMETER LISTS

```
Do;
Set E15 Input Mod flag showing Caller will be supplying input
Save Address and Addressing mode of E15 exit 160
End;
If this was the last entry, goto End_of_Parameter_List
{Process E35 Entry Point & Addressing mode}
If E35 Address 116 was passed Then
Do;
Set flag showing Caller will be handling output
Save Address and Addressing mode of E35 exit 162 in COMEXITS
table
End;
If this was the last entry, goto End_of_Parameter_List
{Process Users Address Constant}
Save the Users Adcon field 118
If this was the last entry, goto End_of_Parameter_List
{Process ALTSEQ Table Address}
If an Alternate collating sequence table address 120 was passed
Do;
Save address of ALTSEQ table 122
Set flag showing table 122 was passed from parameter list 101
End;
If this was the last entry, goto End_of_Parameter_List
{Process (E)STAE Status Area Address Pointer}
If an (E)STAE Status Area Address Pointer 130 was passed Then
Do;
Save Status Area 134 Address
Set flag showing (E)STAE status area present
End;
If this was the last entry, goto
End_of_Parameter_List
{Process E18 Entry Point & Addressing mode}
If E18 Address 138 was passed Then
Do;
Save Address and Addressing mode of E18 exit
End;
If this was the last entry, goto End_of_Parameter_List
{Process E39 Entry Point & Addressing mode}
If E39 Address 142 was passed Then
Do;
Save Address and Addressing mode of E39 exit in COMEXITS table
End;
If this was not the last entry
Then Set flag showing error in parameter list
End_of_Parameter_List:
If control statement 108 was passed in address pointer
102, in the parameter list 101 Then
Do;
Scan the keyword cards 108 for the presence of an 'OPTION' control
card.
If OPTION card is located Then
Do;
If SORTIN keyword 124 is present on OPTION card
Set the ddname specified by this keyword into COMSORTN
Otherwise set 'SORTIN' into COMSORTN
If SORTOUT keyword 126 is present on OPTION card
Set the ddname specified by this keyword into COMSORTO
Otherwise set 'SORTOUT' into COMSORTO.
End;
{Locate and process all relevant DD cards for Sort}
If SORTIN 124 was passed on the OPTION control statement
Then If Caller 68 is not performing the Input
Then validate that ddname in COMSORTN is known to the operating
system
If ddname waa found, then
Do;
Build DCB and IOB control blocks 210 for the supplied
SORTIN ddname. Save the pointer to the DCB in COMINDCB 218.
Note: As all I/O references to SORTIN use COMINDCB, the
ddname passed with the SORTIN keyword will be used
as the SORTIN file.
End;
Else issue error message and return to caller.
Otherwise IGNORE SORTIN dd because caller is supplying input.
If SORTOUT 126 was passed on the OPTION control statement
Then if Caller 68 is not processing the Output
Then validate that ddname stored in COMSORTO is known to system
If ddname was known, then
Do;
Build DCB and IOB control blocks 200 for the supplied
SORTOUT ddname. Save the pointer to the DCB in COMUTDCB 208.
```

TABLE 2-continued
PROCESS PARAMETER LISTS

Note: As all I/O references to SORTOUT use COMUTDCB, the
ddname passed with the SORTOUT keyword will be used
as the SORTOUT file.
End;
Else issue error message and return to caller
Otherwise IGNORE SORTOUT because caller is handling output.
If an E18 exit 164 is present, then
Call E18 exit.
Process the parameter list 184 passed back from the E18 exit
setting values in the DCB 210 pointed to by COMINDCB 218.
COMINDCB points either to the SORTIN DD card or the DD card
passed by the SORTIN keyword of the OPTION control card.
IF SYNAD address 190 passed in list 184, set DCBSYNAD field 122
with value.
IF EXLST address 192 passed in list 184, set DCBEXLST field 214
with value.
IF EOD address 194 passed in list 184, set COME18ND field 224 to
EOD 222 address.
End;
If an E39 exit is present, then
Call E39 exit 166.
Process the parameter list 186 passed back from the E39 exit setting
values in the DCB 200 pointed to by COMUTDCB 208. COMUTDCB points
either to the SORTOUT DD card or the DD card passed by the SORTOUT
keyword of the OPTION control card.
IF SYNAD address 196 passed in list 186, set DCBSYNAD field 204
with its value.
IF EXLST address 198 passed in list 186, set DCBEXLST field 202
with its value.
End;

TABLE 3

If the user 68 is performing the input
Then
Do Until no more input.
Invoke the E15 exit 160 to pass control to caller 68 to obtain the
next input record.
Receive control back from E15.
Take record supplied from E15 and place into RSA 76, using
replacement selection algorithms.
If RSA 76 is full
Then write strings from RSA to Sortwk device 22, 24
End;
Else {Sort performs the input}
Do;
Do Until no more input.
Pass control 174 to the operating system to read a
block of records from the Sortin file described by
COMINDCB 218 and DCB 210.
{This is either an EXCP request or a BSAM READ request}
If an error did not occur, receive control back from operating
system.
Place input records into the RSA 76 using replacement selection
algorithms.
If RSA is full
Then write strings from RSA to Sortwk device 22,24
End;
{End Of Data (EOD) occurred}
If the user passed an EOD routine 222 by Exit E18 164
Then invoke that routine. {This passes control back to caller}
Receive control back from EOD routine 222.
End;
If an error occurs during the read operation then
the operating system checks if the DCBSYNAD field
212 points to a caller supplied SYNAD (error analysis)
routine 220. If so, the operating system passes control
to the caller's SYNAD routine 220. The caller's SYNAD
routine 220 can analyze the error condition and decide whether
to continue or terminate the Sort process. If the
caller decides to continue the Sort, control is returned to the
Sort as if no error occurred.

TABLE 4

If the user 68 is performing the output
Then
Do Until no more output.
Select a winning record from all the records in the RSA 76.

TABLE 4-continued

Pass the address of the winning record to the E35 exit 162.
Invoke the E35 exit 162 to pass control to caller to process the
output record.
Receive control back from E35.
End;
Else {Sort performs the output}
Do;
Do Until no more output.
Merge blocks of records from the RSA 76 into the
SORTOUT buffers. Pass control to the operating system 62 to write the
block of records to the Sortout file described
by COMUTDCB 208 and DCB 206.
{This is either an EXCP request or a BSAM WRITE request}
If an error did not occur, receive control back from operating
system.
End;
{End Of Data (EOD) occurred}
If the user passed an EOD routine by Exit E39
Then invoke that routine. {This passes control back to caller}
Receive control back from EOD routine.
End;
If an error occurs during the write operation then
the operating system 62 checks if the DCBSYNAD 204 field
points to a caller supplied SYNAD (error analysis)
routine. If so, the operating system passes control
to the caller's SYNAD routine. The caller's SYNAD routine
can analyze the error condition and decide whether
to continue or terminate the Sort process. If
the caller decides to continue the Sort, control is returned to
the Sort as if no error occurred.

In Tables 5 and 6 are set forth an example showing the use by caller 68 of the dynamic invocation technique of the invention. The job control language (JCL) for program MYSORT and highlights of the code for program MYSORT are shown in Tables 5 and 6, respectively.

TABLE 5
JCL FOR MYSORT

```
//EXAMP JOB A400,PROGRAMMER
//EXEC PGM=MYSORT                              01
//MSGOUT DD SYSOUT=A                           02
//SORTIN DD DSNAME=INP1,DISP=OLD,
```

TABLE 5-continued
JCL FOR MYSORT

```
UNIT=3350
//DCB=(RECFM=FB,BLKSIZE=7200,LRECL=80),
VOL=SER=335001
//SORTOUT DD DSNAME=&&OUTPUT,DISP=(,PASS),
UNIT=SYSDA,
//SPACE=(CYL,(5,1)),DCB=(RECFM=F,LRECL=111)
//SORTWKOI DD SPACE=(CYL,(10)),UNIT=3350        03
//SORTCNTL DD *                                  04
   OPTION EQUALS,FILSZ=E30000,NOWRKSEC           05
   INCLUDE COND=(5,8,GT,13,8),FORMAT=FI          06
   OUTREC FIELDS=(5X,5,8,5X,13,8,5X,1,80)        07
/*                                               08
//SYSOUT DD SYSOUT=A                             09
```

TABLE 6
CODE HIGHLIGHTS FOR MYSORT

```
MYSORT   CSECT                                                              10
         .
         .
         .
         LA     R1,PL1        SET ADDRESS OF PARAMETER LIST          11
                              TO BE PASSED TO SORT/MERGE
         ST     R2,PL4        SET ADDRESS OF GETMAINED AREA
                              TO BE PASSED TO E15
         LINK   EP=SORT       INVOKE SORT/MERGE
         .
         .
         .
PL1      DC     A(CTLST)      ADDRESS OF CONTROL STATEMENTS          12
PL2      DC     A(E15)        ADDRESS OF E15 ROUTINE
PL3      DC     A(0)          NO E35 ROUTINE
PL4      DS     A             USER EXIT ADDRESS CONSTANT
PL5      DC     F'-1'         INDICATE END OF LIST
CTLST    DS     0H            CONTROL STATEMENTS AREA                13
         DC     AL2(CTL2-CTL1) LENGTH OF CHARACTER STRING
CTL1     DC     C' SORT FIELDS=(4,5,CH,A)'                           14
         DC     C' OPTION'                                           15
         DC     C'RESINV=2048,FILSZ=E25000,MSGDDN=MSGOUT'
         DC     C' OMIT COND=(5,8,EQ,13,8),FORMAT=FI'                16
CTL2     EQU    *
OUT      DCB    DDNAME=SYSOUT,... MYSORT USES SYSOUT
E15      DS     0H            E15 ROUTINE                            17
         .
         .
         .
         BR     R14           RETURN TO SORT/MERGE
* MAPPING OF PARAMETER LIST PASSED TO E15 FROM SORT/MERGE
SRTLST   DS     A             ADDRESS OF RECORD                      18
GMA      DS     A             ADDRESS OF AREA GETMAINED BY
*                             MYSORT
         .
         .
         .
```

Referring to Table 5, line 01, the EXEC statement specifies the name of the program 68 calling sort/merge 66. At line 02, the MSGOUT DD statement directs the sort/merge messages to output class A. At line 03, the SORTWK01 DD statement describes a temporary work data set on an IBM 3350 storage device 22 containing 10 cylinders. At line 04, the SORTCNTL DD statement indicates that a data set follows in the input stream. At line 05 appears the OPTION statement. EQUALS specifies that the order of records with equal control fields is to be preserved, overriding the standard default of EQUALS=NO. FILSZ=E30000 specifies the estimated number of records to be sorted, overriding FILSZ=E25000 in the OPTION statement of the invocation parameter list.. NOWRKSEC specifies that no automatic secondary allocation is to take place for the temporary work data set, overriding the standard default of WRKSEC=YES. Line 06 is the INCLUDE statement. COND and FORMAT specify that input records in which the fixed-integer number in positions 5 to 12 is greater than the fixed-integer number in positions 13 to 20 are the only input records which will be included in the output data set. The INCLUDE statement causes the OMIT statement of the invocation parameter list to be ignored. Line 07 is the OUTREC statement. FIELDS specifies how the input records are to be reformatted before they are output. The output records will be fixed-length, with a record size of 111 bytes. They will look as follows: position 1-5, blanks; position 6-13, input positions 5-12; position 14-18, blanks; position 19-26, input positions 13-20; position 27-31, blanks; and position 32-111, input positions 1-80. Line 08 marks the end of the SORTCNTL data set. Line 09, because SYSOUT DD statement is used by MYSORT, it cannot be used by sort/merge.

Referring to Table 6, line 10 marks the start of the MYSORT program. In this example, assume that it GETMAINs a workarea, saves its address in register 2, and initializes the workarea for use by its E15 routine. At line 11, before calling sort/merge, MYSORT places the address of the parameter list to be passed to sort/merge in register 1, places the address of the GETMAINed workarea in the user exit address constant field in the parameter list, and indicates that the user exit address constant field is the last field in the parameter list (that is, there is no ALTSEQ table or STAE routine). Then MYSORT calls sort/merge. At line 12, the parameter list which MYSORT passes to sort/merge contains the address of the control statements area, the address of the E15 routine, and the address of the GETMAINed workarea. It indicates there is no E35 routine.

At line 13, the control statements area contains the length of the control statements character string, followed by the character string which contains a SORT statement and an OPTION statement. Line 14 is the SORT statement. FIELDS specifies a control field in the input records. Line 15 is the OPTION statement. RESINV=2048 specifies the number of bytes to be reserved for the invoking program (MYSORT), overriding the standard default of RESINV=0. FILSZ-=E25000 specifies the estimated number of records to be sorted. (There is no standard default for FILSZ.) MSGDDN=MSGOUT specifies the DDname to be used for program messages, overriding the standard default of MSGDDN=SYSOUT. Note that RESINV=2048 and MSGDDN=MSGOUT cannot be overridden by corresponding options specified in the SORTCNTL data set; these options are ignored when specified in the SORTCNTL data set because it is too late to use them when they are read. Line 16 is the OMIT statement. COND and FORMAT specify that input records in which the fixed-integer number in positions 5 to 12 is equal to the fixed-integer number in positions 13 to 20 are to be deleted. At line 17, the E15 routine receives control once for each input record before the input record is processed by sort/merge. At line 18, the parameter list passed to E15 by sort/merge will contain the address of the input record, and the address of the workarea which was GETMAINed and initialized by MYSORT.

The cumulative effect of the control statements in the SORTCNTL data set and the control statements in the invocation parameter list is the equivalent set of control statements for the run set forth in Table 7.

Having shown and described one embodiment of this invention, those skilled in this art will appreciate that many variations and modifications can be made to practice the invention and still be within the spirit and scope thereof. Thus, the invention is intended to be limited only by the claimed matter as indicated in the claims hereinafter set forth.

TABLE 7

| EQUIVALENT CONTROL STATEMENT SET |
|---|
| SORT FIELDS=(4,5,CH,A) |
| OPTION EQUALS,FILSZ=E30000,NOWRKSEC, RESINV=2048,MSGDDN=MSGOUT |
| INCLUDE COND=(5,8,GT,13,8),FORMAT=FI |
| OUTREC FIELDS=(5X,5,8,5X,13,8,5X,1,80) |

We claim:

1. A method for operating a computing apparatus under control of a sort program for sorting a plurality of records in an input file into an output file in response to a request from an application program, comprising the steps of:
   receiving control from said application program;
   obtaining from said request the data set names of said input file and said output file;
   reading from said input file a plurality of records to be sorted;
   sorting said records;
   writing the sorted records to said output file; and then returning control to said application program.

2. The method of claim 1, responsive to said request specifying that error information is to be communicated to said application program, comprising the further step of establishing a data set control parameter list for use by an operating system error handling utility in returning error status information and control to said application program.

3. The method of claim 2, wherein said establishing step includes the step of executing an application program provided exit routine to establish addressability to an application program provided error routine for execution by said operating system error handling utility.

4. A method for operating a computing apparatus under control of a sort program and in response to an application program request including an interface parameter list, the interface parameter list including a pointer to an application program provided control statement list and optionally including one or more exit routine identifiers, comprising the steps of:
   responsive to said interface parameter list identifying a user supplied exit for processing an input file, reading records directly by said sort program from the input file identified in the control statement list;
   sorting the input records into sorted sequence; and
   responsive to said interface parameter list identifying a user supplied exit for processing an output file, writing records directly by said sort program to the output file identified in the control statement list.

5. The method of claim 4, comprising the further step, responsive to said interface parameter list identifying a user supplied error exit for specifying error recovery processing, of executing said user supplied exit to establish a data set control parameter list for use by an operating system error handling utility in returning error status information and control to said application program.

6. The method of claim 5, further including the step of executing an application program provided error exit routine to establish addressability to an application program provided error routine for execution by said operating system error handling utility.

7. The method of claim 6, wherein said error exit routine establishes addressability to an exit list specifying the addresses of a plurality of application program provided functional routines for selective execution by the operating system in response to sort program invocation of functions specified in said control statement list.

8. The method of claim 7, wherein the functional routines include one or more routines for processing in connection with data set open, data set close, end-of-volume, and label handling functions.

9. A method for operating a computing apparatus under control of a utility program, the utility program being dynamically invoked by an application program by means including a parameter list, the parameter list referencing application program provided routines selectively for use by the utility program and an operating system in processing input and/or output data sets, comprising the steps executed under control of said utility program of
   responsive to said parameter list, establishing addressability to an application program provided error recovery routine for use by the operating system when processing said input and/or output data sets to communicate status and error information directly to said application program;
   responsive to said parameter list, establishing addressability to application program provided control blocks for use by said utility program when invoking the operating system to process said input and/or output data sets; and invoking said operating system selectively to read said input data set and write said output data set.

10. The method of claim 9, wherein said utility program operates said computing apparatus to sort data records read from said input data set, the output being written to said output data set.

11. The method of claim 10, wherein said parameter list specifies the addressing mode to use in establishing addressability.

12. A method for operating a computing apparatus selectively under control of an application program, a utility program, and an operating system, comprising the steps of operating said computing apparatus under control of said application program to generate and store a parameter list and to dynamically invoke the utility program, the parameter list selectively specifying exit and error routines to be executed in processing input and output data sets;

operating said computing apparatus under control of said utility program to establish addressability to said error routines and selectively to invoke said operating system to process the input and output data sets;

operating said computing apparatus under control of said operating system selectively to read data from said input data set and write data to said output data set; and responsive to an error occuring selectively during a read or write of a data set, operating said computing apparatus under control of said operating system to execute said error routine;

whereby even though the operating system may be called by said utility program to read and/or write the data sets, yet status and error information is communicated by said operating system directly to said application program.

13. A method for operating a computing apparatus under control of a utility program which, responsive to a dynamic invocation request from an application program, processes records in an input file to provide an output file, comprising the steps executed by said utility program of receiving control from the application program responsive to a request including a parameter list, the parameter list selectively including the data definition names of the input file and output file and optionally referencing one or more error recovery routines;

establishing addressability to any error recovery routines, for use by operating system services if an error occurs when accessing the input and/or output files;

invoking operating system services to read from the input file a plurality of records to be processed;

processing the records; and then invoking operating system services to write the processed records to the output file.

* * * * *